Patented Aug. 12, 1952

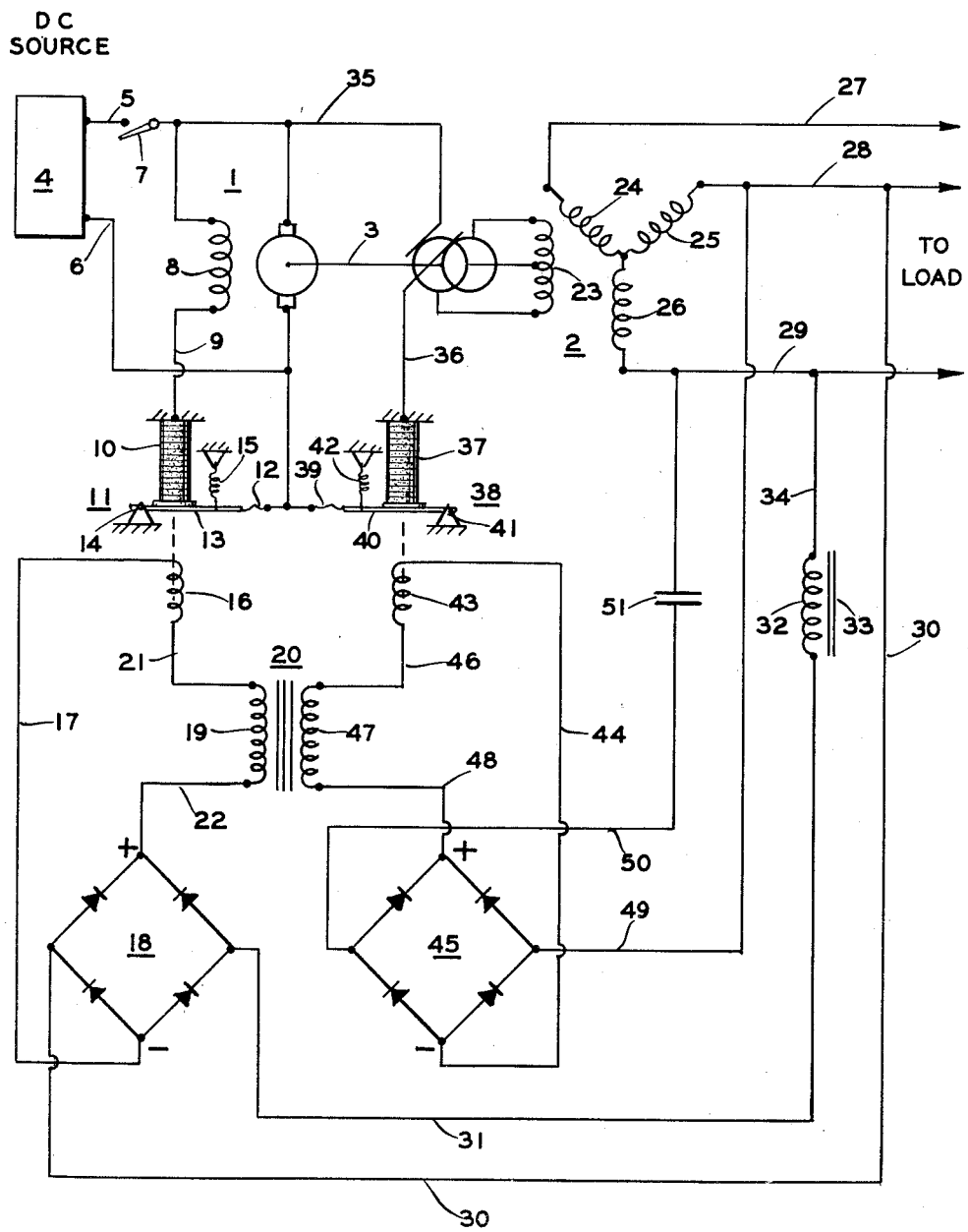

2,607,028

UNITED STATES PATENT OFFICE 2,607,028

VOLTAGE AND FREQUENCY REGULATOR

Lawrence E. Gartner, Lodi, N. J., assignor to Bendix Aviation Corporation, Teterboro, N. J., a corporation of Delaware Application September 11, 1950, Serial No. 184,280

6 Claims. (Cl. 322—19)

The present invention relates to electrical regulating systems and more particularly to improvements in anti-hunting means in a voltage and frequency regulating system.

Most regulating systems have an inherent tendency to overshoot or hunt thus causing undesirable fluctuations. Some form of stabilizing or anti-hunting means are necessary in order to permit greater latitude in the regulator adjustment.

In a regulator in which both frequency and voltage are controlled, such as, for example, that disclosed and claimed in copending application Serial No. 724,130, filed January 24, 1947, now U. S. Patent 2,524,166, a stabilizing or anti-hunt transformer is connected so as to effect a coupling between the control coil of the frequency regulator and the control coil of the voltage regulator. As the currents flowing in the control coil circuits are D. C., the coupling is effected under transient conditions so as to cause a mutual opposition to the transient changes, thus having a damping effect on the system.

It is an object of the invention to provide an improved and novel regulator system.

Another object of the invention is to provide novel and improved anti-hunting means for a regulating system.

Another object of the invention is to provide novel means whereby transient changes are opposed in a regulator.

The above and other objects and features of the invention will appear more fully hereinafter from a consideration of the following description taken in connection with the accompanying drawing wherein one embodiment of the invention is illustrated by way of example.

The drawing is a diagrammatic showing of a voltage and frequency regulating system embodying the invention.

Referring to the drawing, there is indicated by the numeral 1, a motor which drives an A. C. generator or alternator 2 through a shaft 3.

The motor 1 has been illustrated in the form of a direct current motor deriving electrical energy from a suitable D. C. source 4 through conductors 5 and 6 and switch member 7. The motor 1 has a shunt field 8 whose flux determines the speed of the motor 1. One end of the field 8 is connected to the conductor 5, while the opposite end of the field 8 is connected by a conductor 9 to one end of a variable resistance carbon pile element 10 of a regulator indicated generally by the numeral 11. The opposite end of the carbon pile 10 is connected by a conductor 12 to the conductor 6.

The carbon pile element 10 is included in the circuit of the shunt field winding 8 so as to vary the energizing current of the shunt field winding 8 and hence the speed of the motor 1. The speed of the motor 1 increases with a decrease in the excitation of the winding 8 and the speed decreases with an increase in the excitation thereof.

The regulator 11 may be of a type described and claimed in U. S. Patent No. 2,427,805, granted to William G. Neild. The regulator 11 is illustrated diagrammatically herein as including an armature 13 pivoted at 14 and biased by a spring 15 in a direction for decreasing the resistance of the carbon pile element 10. Opposing the spring 15 is an electromagnetic control winding 16. One end of the winding 16 is connected by conductor 17 to one output terminal of rectifier 18. The other end of the winding 16 is connected to one end of winding 19 of transformer 20 by a conductor 21. The other end of the winding 19 is connected by conductor 22 to the other output terminal of rectifier 18.

The A. C. generator 2 driven by the motor 1 through the shaft 3 is illustrated as having a rotating exciting field 23 and three phase stator windings 24, 25 and 26. Output conductors 27, 28 and 29 lead from the stator windings 24, 25 and 26 to a suitable load (not shown). It is understood however, that the A. C. generator could be of the type having a stationary field and rotor armature windings, the rotating field type being shown by way of example and not as a limitation. Further the generator may be single phase or multi-phase.

One input terminal of the rectifier 18 is connected by conductor 30 to output line 28. The other input terminal of the rectifier 18 is connected by conductor 31 to one end of a reactance winding 32 having an iron core 33. The opposite end of the winding 32 is connected by conductor 34 to the output line 29. The impedance of the reactance winding 32 is equivalent to the resistance it replaces at the frequency which it is desired to maintain. Thus, current in the winding 16 decreases with an increase in frequency at a constant voltage across the lines 28 and 29. The latter action in turn causes adjustment of the carbon pile resistance 10 so as to vary the excitation of the motor winding 8 to maintain the desired constant motor speed. It is understood, however, that other impedance devices having the same characteristics may be used, such for example a tuned circuit.

The exciting winding 23 of the A. C. generator 2 has one end connected through the conventional slip rings and conductor 35 to the conductor 5, while the opposite end is connected through the conventional slip rings and conductor 36 to one end of a variable resistance carbon pile element 37 of a regulator indicated generally by the numeral 38. The opposite end of the carbon pile 37 is connected by a conductor 39 to the conductor 6.

The carbon pile 37 is included in the circuit of the exciting winding 23 of the generator 2 so as to vary the exciting current and hence the output voltage from the generator 2. The output voltage from the generator 2 increases with increase in the excitation of the exciting winding 23 and decreases upon a decrease in the excitation thereof.

The regulator 38 may be of the type described in U. S. Patent No. 2,427,805 granted to William G. Neild. The regulator 38 is shown diagrammatically herein as including an armature 40 pivoted at 41 and biased by a spring 42 in a direction for decreasing the resistance of the carbon pile 37. Opposing the spring 42 is an electromagnetic control winding 43.

One end of the winding 43 is connected by conductor 44 to one of the output terminals of rectifier 45. The other end of the winding 43 is connected by conductor 46 to one end of the winding 47 of the transformer 20. The other end of the winding 47 is connected by conductor 48 to the other output terminal of the rectifier 45. The rectifier 45 is connected by conductors 49 and 50 across the output conductors 28 and 29 of the generator 2. Connected in the conductor 50 is a condenser 51 having a value such as to give the correct current to the winding 43 at the voltage and frequency to be regulated. The control circuit is arranged so that as the frequency increases the reactance of the capacitor 51 decreases causing the current affecting the control coil 43 to increase and in turn causing the regulated A. C. output voltage to decrease. The reverse effect occurs upon a decrease in output frequency. Thus, the voltage regulator 38 in addition to being sensitive to voltage is also sensitive to frequency. Other impedances, such as a resistor, having the same characteristics may be substituted for the capacitor.

The regulators 11 and 38 are arranged so as to work towards an equilibrium. Thus, a tendency for a rise in frequency tends through operation of the regulator 38 to decrease the line voltage which in turn tends through operation of the regulator 10 to decrease the frequency. The reverse of this also occurs upon a tendency for a drop in frequency.

The transformer 20 has one winding 19 connected in the circuit with the control winding 16 of the regulator 11 and the other winding 47 connected in the circuit with the control winding 43 of the rectifier 38 thereby effecting a coupling between the control coil 16 of the frequency regulator 11 and the control coil 43 of the voltage regulator 38. Inasmuch as the currents flowing in the aforenoted control circuits are D. C., the coupling is effected under transient conditions leading to hunting and instability.

Under operating conditions of the regulators, the coil currents of the regulators are in opposition. In other words, the voltage regulator coil current tends to decrease while the frequency regulator coil current tends to increase when load is applied and vice versa when the load is removed. The winding 19 and 47 of the transformer 20 are connected to have a polarity such as to cause a mutual opposition to rapid transient changes in the regulator coil currents, thereby effecting a snubbing or damping effect on the system.

It will be seen then that in this manner both regulators 11 and 38 are interacting and interdependent with resulting improvement in regulation and effect an interacting stabilizing action between the regulators 11 and 38, thus permitting greater latitude in regulator adjustment without encountering hunting and instability.

Although only one embodiment of the invention has been illustrated and described, various changes in the form and relative arrangement of the parts, which will now appear to those skilled in the art, may be made without departing from the scope of the invention.

What is claimed is:

1. Apparatus for use in regulating the output voltage and frequency of an alternating current generator driven by an electric motor, comprising means including a control winding for controlling the speed of rotation of said motor, other means including a second control winding for controlling the voltage output of said generator, and inductive means associated with each of said windings and positioned in inductive relationship for interconnecting said control windings to effect an interacting stabilizing action between said speed and voltage control means.

2. Apparatus for use in regulating the output voltage and frequency of an alternating current generator driven by an electric motor, comprising a regulator responsive to the frequency of said generator for controlling the speed of said motor, said speed regulator including an electromagnetic winding for controlling said regulator, a second regulator responsive to the voltage of said generator for controlling the voltage of said generator, said voltage regulator including an electromagnetic winding for controlling said regulator, and inductive means in circuit relationship with each of said windings responsive to transient surges for effecting a coupling between said winding so as to cause a mutual opposition to said transient surges.

3. Apparatus for use in regulating the output voltage and frequency of an alternating current generator driven by an electric motor, comprising a source of electrical energy for energizing said motor, a shunt field winding for controlling the speed of said motor and connected across said source of electrical energy, a variable resistance element connected in the shunt field circuit of said motor, an electromagnetic winding for regulating said element, a rectifier, a circuit for connecting said electromagnetic winding through the rectifier to the output of the generator, said circuit including an iron core reactance for affecting said electromagnetic winding so as to increase the regulated frequency upon an increase in the voltage output of said generator, an exciting winding for controlling the voltage output of said generator, a second variable resistance element connected in said exciting field circuit, a second electromagnetic winding for regulating said second element, a second rectifier, a second circuit for connecting said second electromagnetic winding through said second rectifier to the output of said generator, said second circuit including a capacitor for affecting said second electromagnetic winding so as to decrease the regulated voltage upon an increase in the output frequency of the generator, said first and second circuits coacting in maintaining a predetermined regulated condition, and transformer means responsive to transient changes in said electromagnetic windings to effect a coupling between said electromagnetic windings so as to cause a mutual opposition to said transient changes.

4. Apparatus for use in regulating the output voltage and frequency of an alternating current generator driven by an electric motor, comprising a shunt field winding for controlling the speed of the motor, a variable resistance element connected in the shunt field circuit of said motor, a rectifier, a circuit for connecting said electromagnetic winding through said rectifier to the output of said generator, said circuit including means for affecting said electromagnetic winding so as to increase the regulated frequency upon an increase in the output voltage of said generator, an exciting winding for controlling the voltage output of said generator, a second variable resistance element connected in the exciting field circuit of said generator, a second electromagnetic winding for regulating said second element, a second rectifier, a second circuit for connecting said second electromagnetic winding through said second rectifier to the output of said generator, said second circuit including means for affecting said second electromagnetic winding so as to decrease the regulated voltage upon an increase in the output frequency of said generator, a transformer having one winding connected in the first electromagnetic circuit and another winding connected in the second electromagnetic circuit to effect a coupling between said electromagnetic windings under transient changes in said circuits, said circuits thereby coacting in maintaining a predetermined stable regulated condition.

5. Apparatus for use in regulating the output voltage and frequency of an alternating current generator driven by an electric motor, comprising means adapted to control the speed of said motor in response to the output frequency of said generator, said speed control means including a speed control winding and an impedance for affecting said speed control winding so as to increase the regulated frequency upon an increase in the output voltage of said generator, means for controlling the voltage output of said generator, said voltage control means including a voltage control winding and an impedance for affecting said voltage control winding so as to decrease the regulated voltage upon an increase in the output frequency of the generator, and anti-hunting means including a transformer having a winding in circuit relationship with each of said control windings to effect a coupling between said windings in response to transient surges in said regulating apparatus.

6. Apparatus for use in regulating the output voltage and frequency of an alternating current generator driven by an electric motor, comprising electromagnetic control means for said motor, a control circuit including a rectifier for connecting said control means to the output of said generator, other electromagnetic control means for said generator, a second control circuit including a second rectifier for connecting said other control means to the output of said generator, and anti-hunting means including a transformer having windings in circuit relationship with each of said electromagnetic control means for inductively coupling said control means so as to cause a mutual opposition to transient changes.

LAWRENCE E. GARTNER.

No references cited.